United States Patent
Weiss et al.

(10) Patent No.: US 10,404,559 B2
(45) Date of Patent: Sep. 3, 2019

(54) APPARATUS AND SYSTEM FOR AUTOMATICALLY REBOOTING AN ELECTRONICALLY POWERED DEVICE VIA POWER OVER ETHERNET

(71) Applicant: DATAPROBE INC, Allendale, NJ (US)

(72) Inventors: David Weiss, Wayne, NJ (US); Jeffery Schaefer, Woodbridge, NJ (US)

(73) Assignee: Dataprobe Inc., Allendale, NJ (US)

( * ) Notice: Subject to any disclaimer, the term of this patent is extended or adjusted under 35 U.S.C. 154(b) by 0 days.

(21) Appl. No.: 15/205,231

(22) Filed: Jul. 8, 2016

(65) Prior Publication Data

US 2017/0019294 A1  Jan. 19, 2017

Related U.S. Application Data

(60) Provisional application No. 62/193,911, filed on Jul. 17, 2015.

(51) Int. Cl.
| | |
|---|---|
| *H04L 12/26* | (2006.01) |
| *H04L 12/10* | (2006.01) |
| *H04L 12/24* | (2006.01) |

(52) U.S. Cl.
CPC .......... *H04L 43/0817* (2013.01); *H04L 12/10* (2013.01); *H04L 41/0654* (2013.01); *H04L 43/10* (2013.01)

(58) Field of Classification Search
CPC ..... H04L 41/0889; H04L 12/10; H04L 43/10; H04L 43/103; H04L 43/106; H04L 43/12; H04L 43/14; H04L 43/18; H04L 43/50; H04L 43/16; H04L 41/0654; H04L 41/0663; H04L 41/0672; H04L 41/0806; H04L 41/0809; H04L 41/0813;
(Continued)

(56) References Cited

U.S. PATENT DOCUMENTS

| | | | |
|---|---|---|---|
| 5,410,706 A | 4/1995 | Farrand et al. | |
| 6,651,190 B1 | 11/2003 | Worley et al. | |

(Continued)

FOREIGN PATENT DOCUMENTS

| | | |
|---|---|---|
| CN | 102354261 A | 2/2012 |
| EP | 532249 B1 | 11/1999 |

(Continued)

*Primary Examiner* — Greg C Bengzon
(74) *Attorney, Agent, or Firm* — Gearhart Law LLC

(57) ABSTRACT

An apparatus for remotely rebooting an electronic device may have an first port adapted to interface with a first communications line capable of transmitting and receiving both data and power, an second port adapted to interface with a second communications line capable of transmitting and receiving both data and power, at least two status light emitting diodes, and at least one power port capable of receiving power from an external power supply module. The apparatus uses an auto-ping, traffic monitor, and heartbeat methodology to manage the operable state of a PSE, PD, or Ethernet traffic. If either one is deemed to have become non-functional or otherwise fall below set operating standards, the apparatus sends a signal to reboot the particular device in question. This removes the need for a manual reboot of a particular device such as a peripheral device in an electronic system.

8 Claims, 9 Drawing Sheets

(58) Field of Classification Search
CPC ............. H04L 41/0816; H04L 41/082; H04L 41/0866; H04L 41/0869; H04L 41/0873; H04L 41/0876; H04L 41/08; H04L 41/0886; H04L 41/16; H04L 43/0805; H04L 43/0811; H04L 43/0817; H04L 43/0829; H04L 43/0835; H04L 49/557; H04L 12/2678; H04L 12/2681; H04L 12/2686; H04L 12/268; H04L 12/2694; H04L 12/2697; H04L 12/2825; H04L 12/287; H04L 64/1026; H04L 12/40032; H04L 41/24; H04L 43/062; H04L 43/0841; H04L 43/0858; H04L 43/0864; H04L 12/2602; H04L 41/0213; H04L 41/5003; H04L 41/5038; H04L 43/00; H04L 10/40; H04L 49/351; H04L 41/5025; H04L 41/12; G06F 1/24; G06F 1/266; G06F 1/28; G06F 1/30; G06F 1/3206; G06F 1/3209; G06F 1/3215; G06F 15/17; G06F 15/177; G06F 11/0793; G06F 11/1417; G06F 11/1438; G06F 11/1441; G06F 11/3055; G06F 9/4401; G06F 9/4403; G06F 9/4405; H02J 13/00; H02J 13/0096; H02J 17/00; H04W 52/022; H04W 24/02

See application file for complete search history.

(56) References Cited

U.S. PATENT DOCUMENTS

| | | | |
|---|---|---|---|
| 6,697,892 B1 | 2/2004 | Laity et al. | |
| 6,726,509 B2 | 4/2004 | Milan | |
| 6,954,863 B2 | 10/2005 | Mouton | |
| 7,002,353 B1* | 2/2006 | Lo | H04L 1/248 324/533 |
| 7,035,257 B2 | 4/2006 | Vafaei | |
| 7,358,745 B1* | 4/2008 | Lo | H04L 43/50 324/533 |
| 7,493,502 B2 | 2/2009 | Hsieh | |
| 7,627,398 B1* | 12/2009 | Bennett | H04L 12/10 700/286 |
| 7,680,254 B2 | 3/2010 | Archer et al. | |
| 8,140,658 B1 | 3/2012 | Gelvin et al. | |
| 8,370,550 B2 | 2/2013 | Creasey et al. | |
| 8,370,656 B2 | 2/2013 | Gupta | |
| 8,504,810 B2 | 8/2013 | Challener et al. | |
| 8,601,289 B1* | 12/2013 | Smith | H04L 12/10 713/300 |
| 8,645,520 B2 | 2/2014 | Sutherland et al. | |
| 8,793,364 B1 | 7/2014 | Barkelew et al. | |
| 8,806,576 B1 | 8/2014 | Corddry et al. | |
| 9,025,490 B2* | 5/2015 | Davari | H04L 41/5038 370/254 |
| 9,258,765 B1* | 2/2016 | daCosta | H04W 84/18 |
| 9,549,234 B1* | 1/2017 | Mascitto | H04Q 11/0071 |
| 9,654,350 B2* | 5/2017 | Davari | H04L 41/24 |
| 9,860,071 B2* | 1/2018 | Bodo | H04L 12/10 |
| 2001/0005894 A1 | 6/2001 | Fukui | |
| 2003/0023842 A1 | 1/2003 | Honeycutt et al. | |
| 2003/0023843 A1 | 1/2003 | Heath et al. | |
| 2003/0039261 A1 | 2/2003 | Purpura | |
| 2003/0085803 A1 | 5/2003 | Bapat | |
| 2005/0060529 A1 | 3/2005 | Chen | |
| 2005/0246343 A1 | 11/2005 | Burns et al. | |
| 2005/0257041 A1 | 11/2005 | Wallenstein et al. | |
| 2006/0101116 A1 | 5/2006 | Rittman et al. | |
| 2006/0239183 A1* | 10/2006 | Robitaille | G06F 1/266 370/217 |
| 2007/0081549 A1* | 4/2007 | Cicchetti | H04L 12/10 370/447 |
| 2008/0077811 A1 | 3/2008 | Dove | |
| 2008/0294915 A1* | 11/2008 | Juillerat | G06F 1/266 713/300 |
| 2009/0027057 A1* | 1/2009 | Anderson | H04L 12/10 324/457 |
| 2009/0083555 A1 | 3/2009 | Challener et al. | |
| 2009/0091468 A1* | 4/2009 | O'Bra | H04L 43/0817 340/815.69 |
| 2010/0145543 A1* | 6/2010 | Middlemiss | G06F 1/266 700/295 |
| 2010/0169677 A1* | 7/2010 | Madhusoodanan | G06F 1/3209 713/310 |
| 2010/0169689 A1* | 7/2010 | Liu | H04L 12/10 713/340 |
| 2011/0107116 A1* | 5/2011 | Diab | H04L 12/10 713/300 |
| 2012/0023340 A1* | 1/2012 | Cheung | G06F 1/266 713/300 |
| 2012/0182900 A1* | 7/2012 | Davari | H04L 12/10 370/254 |
| 2012/0301134 A1* | 11/2012 | Davari | H04L 41/5038 398/9 |
| 2013/0031341 A1 | 1/2013 | Ganti et al. | |
| 2013/0077499 A1* | 3/2013 | Schmitz | H04J 3/0688 370/249 |
| 2013/0124724 A1* | 5/2013 | Madgwick | H04L 43/12 709/224 |
| 2013/0159754 A1* | 6/2013 | Wendt | H04L 12/10 713/330 |
| 2013/0246552 A1* | 9/2013 | Underwood | G06F 15/167 709/212 |
| 2014/0043957 A1* | 2/2014 | Venkatraman | H04L 41/0672 370/216 |
| 2014/0115354 A1* | 4/2014 | Jabbaz | G06F 1/266 713/310 |
| 2014/0232299 A1* | 8/2014 | Wang | H04L 12/10 315/362 |
| 2014/0258504 A1* | 9/2014 | Kahkoska | H04L 43/50 709/224 |
| 2014/0310604 A1* | 10/2014 | Kahkoska | H04L 43/50 715/736 |
| 2014/0369180 A1* | 12/2014 | Shimokawa | H04L 49/40 370/217 |
| 2014/0370928 A1* | 12/2014 | Ge | H04W 52/04 455/522 |
| 2015/0006982 A1* | 1/2015 | Kahkoska | H04L 43/50 714/712 |
| 2015/0023148 A1* | 1/2015 | Ji | H04L 41/065 370/216 |
| 2015/0282177 A1* | 10/2015 | Dong | H04L 43/0811 370/329 |
| 2015/0312048 A1* | 10/2015 | Bodo | H02J 13/0062 713/300 |
| 2015/0331464 A1* | 11/2015 | Balasubramanian | G06F 13/387 713/310 |
| 2015/0331821 A1* | 11/2015 | Liston | G06F 13/387 710/106 |
| 2015/0382208 A1* | 12/2015 | Elliott | H04W 16/18 370/252 |
| 2016/0173511 A1* | 6/2016 | Bratspiess | H04L 41/145 726/23 |

FOREIGN PATENT DOCUMENTS

| | | |
|---|---|---|
| JP | 2001211232 A | 8/2001 |
| TW | 201324115 A | 6/2013 |
| TW | 201441930 A | 11/2014 |
| WO | WO1993010615 A1 | 5/1993 |
| WO | WO2006047583 A2 | 5/2006 |
| WO | WO2006047583 A3 | 4/2009 |

* cited by examiner

APPARATUS AND SYSTEM FOR AUTOMATICALLY REBOOTING AN ELECTRONICALLY POWERED DEVICE VIA POWER OVER ETHERNET

CLAIM OF PRIORITY

This application claims the priority of U.S. Ser. No. 62/193,911 filed on Jul. 17, 2015, the contents of which are fully incorporated herein by reference in its entirety.

FIELD OF THE EMBODIMENTS

The field of the invention and its embodiments relate to a power hub or apparatus that supplies power over Ethernet (POE) to at least one powered device (PD) from a powered source equipment (PSE). In particular, the present invention enables a manual reboot of the PD from a remote location or alternatively an automatic reboot of the PD via an automatic signaling protocol.

BACKGROUND OF THE EMBODIMENTS

Technology has made many advances that makes everyday life easier for most of society. As technology has evolved, numerous methodologies and practices have been found to streamline processes and combine technologies to harness new features. One such example is the power over Ethernet (POE) system which enables both electrical power and data to be sent via the same cabling. POE eliminates the need for multiple inputs on an electronic device as well as removes the need for additional lengths of wiring and places to store this additional wiring. In practice, some electronic devices that implement POE are voice over IP (VOIP) phones, IP cameras, and network routers/switches.

In addition to POE technologies, many everyday objects now incorporate "smart" technologies and can be used, interconnected, and accessed from a variety of locations forming what is commonly referred to as the "internet of things." For example, electronic files can be stored in the "cloud." This enables a person to provide their credentials and access the files anywhere in the world. All that is required is an internet enabled connection independent of a dedicated electronic device being attached to that file. However, technology in this area still has its drawbacks.

While one can monitor, manipulate, and otherwise access machines and information remotely, if the machine becomes "hung up" or crashes, then one must still physically send a person to restart or reboot the machine or connected device. Typically this requires taking an individual off a job or even hiring an outside contractor to resolve the issue. The necessity of sending a person to manually complete this reboot costs the company time and money. Further, the downed equipment may cause consumer dissatisfaction in the event the machine is a generally standalone piece of equipment such as an automated teller machine (ATM).

Thus, it is desirable to have an apparatus and methodology that would enable a crashed or hung-up or otherwise non-operational electronic device to be rebooted remotely. Further, by employing a POE connection to the electronic device, the benefits of a POE system can be combined with an automated monitoring and rebooting thus saving time and money for all involved. The present invention and its embodiments meets and exceeds these objectives. Review of related technology:

U.S. Pat. No. 8,504,810 pertains to a method relating to a computer usable medium and computer system circuitry are for starting or "booting up" a computer from a remote location using a remote command device such as a cellular telephone. The method and system includes a secure means for remotely storing and transmitting security passwords.

U.S. Pat. No. 7,493,502 pertains to a remote access power ("RAP") hub for kiosks and information booths with multiple peripherals. The RAP hub provides power at different levels to accommodate different electronic devices and peripherals. The RAP hub also acts as a powered USB hub for connecting multiple USB devices to the devices and peripherals. The RAP hub further has communications functionality so that signals can be transmitted through a network to the hub for controlling the devices and peripherals remotely. The RAP hub is an all-in-one power hub with various power outputs and remote access command. It is designed to support and manage a number of devices and peripherals while avoiding multiple power adapters. A connector block allows the routing of power within multifunction devices, thus eliminating the need for special-ordered wiring harness.

U.S. Patent Application 2005/0257041 pertains to a remote reboot device that allows unattended computer systems to be rebooted or restarted from a remote location. The remote reboot device uses the reset pins on a logic board of a computer system to effectuate a reboot. The remote reboot device includes a network interface for secure communication over a network. A user performs a login procedure to set up a secure communication with the remote reboot device and then selects one or more server to reboot. The remote reboot device sends appropriate signals to the reset pins to perform the reboot operation. Multiple computer systems can be controlled with a single remote reboot device. Alternatively, the remote reboot device may be attached to the power control pins on the logic board of the computer system and use an appropriate signaling sequence to reboot the system.

Various devices are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

Generally, the present invention and its embodiments relate to a device that enables remote control of power switches. This is achieved using a power over Ethernet (POE) protocol that enables the transfer of data and power over the same channels. The device is capable of acting as a remote power switch for at least one POE powered device (PD). In some embodiments, the device may be used as a POE extender or injector in addition to the remote power control aspects. The PD may be virtually any device capable of having a POE connection including but not limited to telephones, cameras, access points, and the like or any combination thereof.

Embodiments of the present invention are preferably coupled to both the PD and the power supply (PSE), in some cases preferably a POE switch, to facilitate the necessary communications. Hence, the present device has a first port for connection of the PSE, or other POE switch, to the device and a second port to connect the PD to the device. The POE switch enables local and/or remote control and monitoring of all POE devices via the dedicated software platform. It is desirable that the device supports both Type 1 (802.3af) and Type 2 (802.3at) POE protocols as well as any future POE protocols. Further features of the present device may include an HTTP web server, a cloud service (for remote monitoring and control), automatic reboot of a PD, and no installation requirement when installed on a network supporting DHCP.

In one embodiment of the present invention there is an apparatus for remotely rebooting an electronic device, the apparatus having an first port adapted to interface with a first communications line, the first communications line being capable of transmitting and receiving both data and power; an second port adapted to interface with a second communications line, the second communications line being capable of transmitting and receiving both data and power; at least two status light emitting diodes, wherein at least one status light emitting diode corresponds to the first port and at least one status light emitting diodes corresponds to the second port; at least one power port capable of receiving power from an external power supply module.

In another embodiment of the present invention there is a method of remotely monitoring and rebooting an electronic device, the method comprising the steps of: coupling at least one monitoring apparatus to at least one electronic device; sending a first signal from the at least one monitoring apparatus to the at least one electronic device, wherein the first signal is sent to at least one internet protocol address associated with the at least one electronic device, wherein if a second signal is received by the at least one monitoring apparatus from the at least one electronic device, then the at least one monitoring apparatus sends a second first signal after a predetermined time period, and wherein if the second signal is not received from the at least one electronic device, then a third signal is sent by the at least one monitoring apparatus to the at least one electronic device, wherein the third signal causes a reboot of the at least one electronic device to occur.

In another embodiment there is a system for monitoring and remotely rebooting at least one electronic device, the system having at least one apparatus, the at least one apparatus having an first port and an second port, wherein each of the first port and the second port are adapted to interface with a first and a second communications line respectively, the first and the second communications line being capable of transmitting and receiving both data and power; a first electronic device communicatively coupled to the at least one apparatus via the second port; a second electronic device communicatively coupled to the at least one apparatus via the first port; a third electronic device communicatively coupled to the second electronic device, wherein the third electronic device is capable of causing a change in the operative state of the first electronic device via the at least one apparatus.

In general, the present invention succeeds in conferring the following, and others not mentioned, benefits and objectives.

It is an object of the present invention to provide an apparatus that enables a manual reboot and/or monitoring of a powered device from a remote location.

It is an object of the present invention to provide an apparatus that enables an automatic reboot of a powered device.

It is an object of the present invention to provide an apparatus that operates as a power over Ethernet injector.

It is an object of the present invention to provide an apparatus that increases a required distance between the powered device and the power sourcing equipment.

It is an object of the present invention to provide an apparatus that does not require a dedicated setup for use.

It is an object of the present invention to provide an apparatus that supports multiple IEEE protocols.

It is an object of the present invention to provide an apparatus that automatically configures and detects internet protocol addresses associated with the powered device.

It is an object of the present invention to provide an apparatus that adapts to varying voltage levels based on the provided voltage by the power sourcing equipment.

DESCRIPTION OF THE PREFERRED EMBODIMENTS

Figure 1:
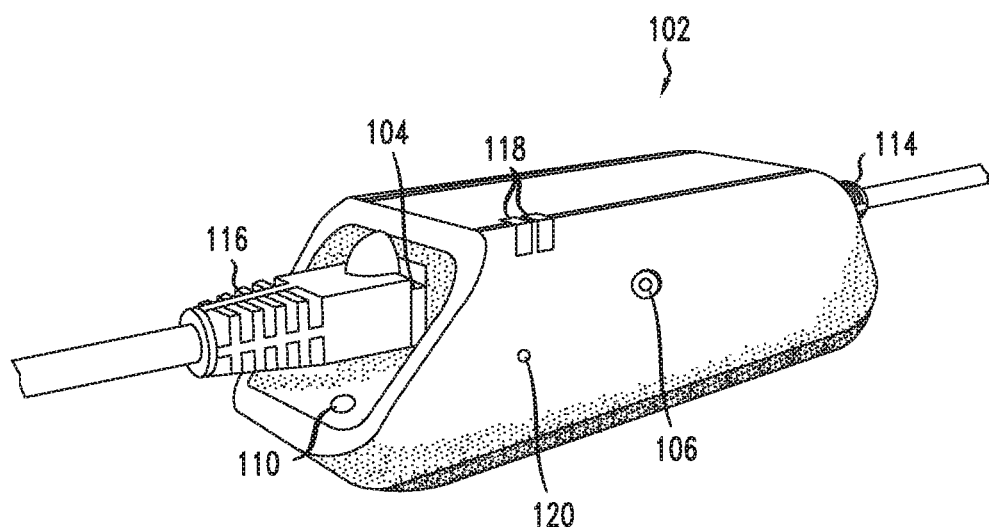
FIG. 1 is a perspective view of an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Figure 2:
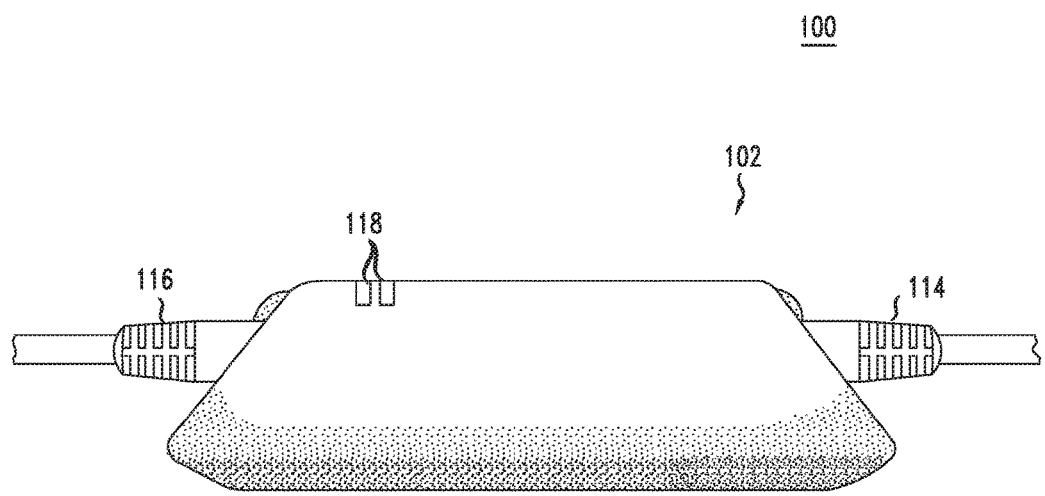
FIG. 2 is a side view of an embodiment of the present invention.
Figure 3:
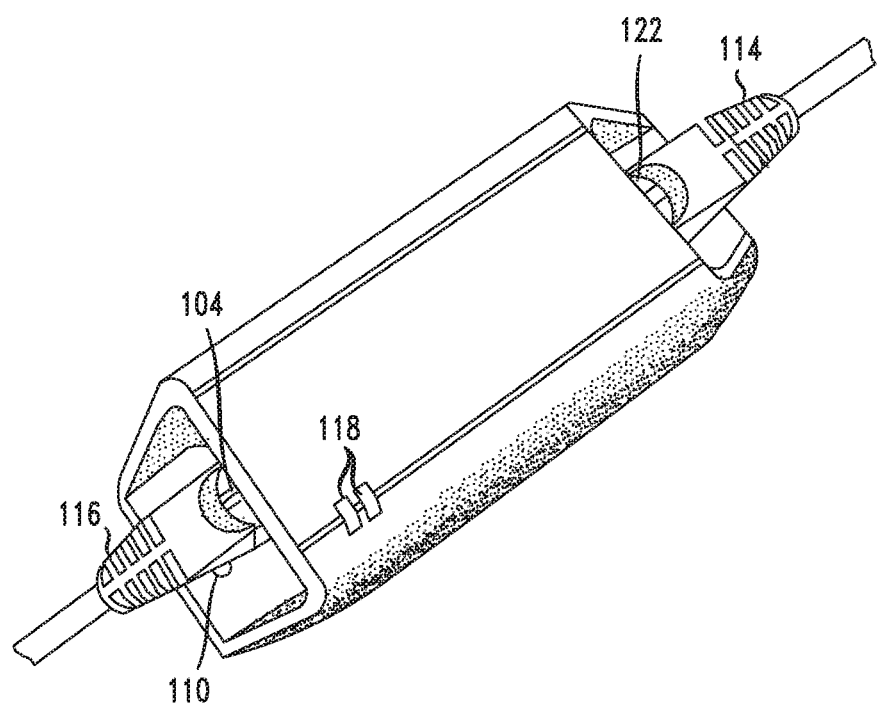
FIG. 3 is a top view of an embodiment of the present invention.

Referring now to FIGS. 1-3, there is an embodiment of the present invention. The apparatus 100 generally has an exterior housing 102, a first port 104, a second port 122, at least one light source 118, at least one securement mechanism 110, a power port 106, and a reset button 120. The first port 104 and second port 122 are capable of interfacing with a first communications line 116 and a second communications line 114 respectively.

The exterior housing 102 houses the internal components such as a printed circuit board (PCB), processor, memory, and the like or some combination thereof. The exterior housing 102 may be made from a variety of materials including but not limited to plastics, metals, rubbers, composites, and the like or any combination thereof. The material selected may vary due to intended use such as an indoor versus an outdoor usage.

Each of the first port 104 and the second port 122 may be configured to receive an Ethernet cable such as a Cat 5, 5E, or 6 cable or other suitable communication line. The power port 106 enables the apparatus 100 to act as a power injector thereby acting as its own power source. A reset button 120 is further provided in order to provide for a manual reset of the apparatus 100.

Figure 4:
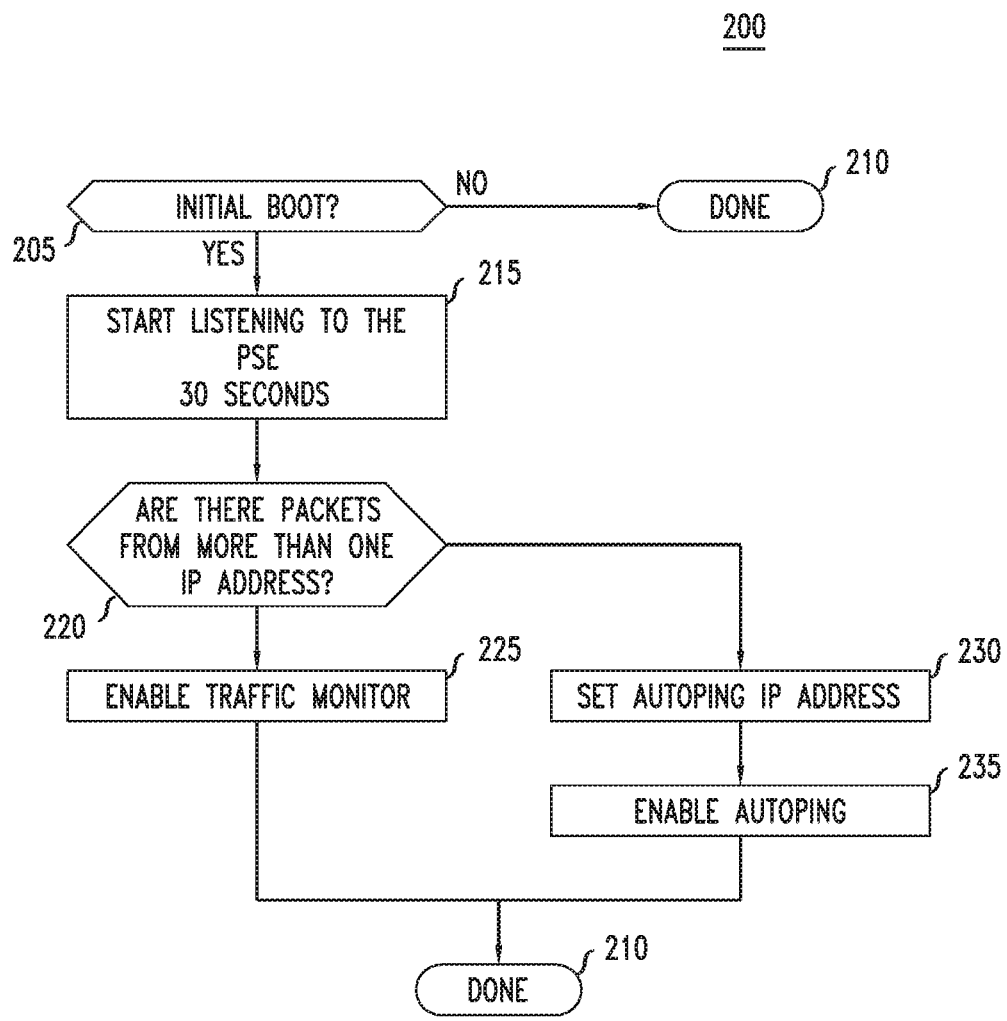
FIG. 4 is a flowchart illustrating a methodology of configuring the present invention.

Referring now to FIG. 4, there is a flowchart illustrating a configuration methodology employed by the device at initial startup. The auto-configuration methodology 200 enables the device to be set up without the need for manual intervention.

In step 205, the device checks to determine if this is an initial startup of the device. If the device determines this is not an initial boot upon power up, the process is terminated in step 210 and the power up is allowed to normally continue. If it is determined to be an initial boot, the process moves to step 215.

In step 215, the device begins to monitor the PSE port to determine if a single or multi ended device is coupled to the device. If there is only one IP address associated with the PSE port, then the process moves to step 230, where the auto-ping is configured (see FIG. 5).

In step 235, the auto-ping functionality is then enabled.

Figure 8:
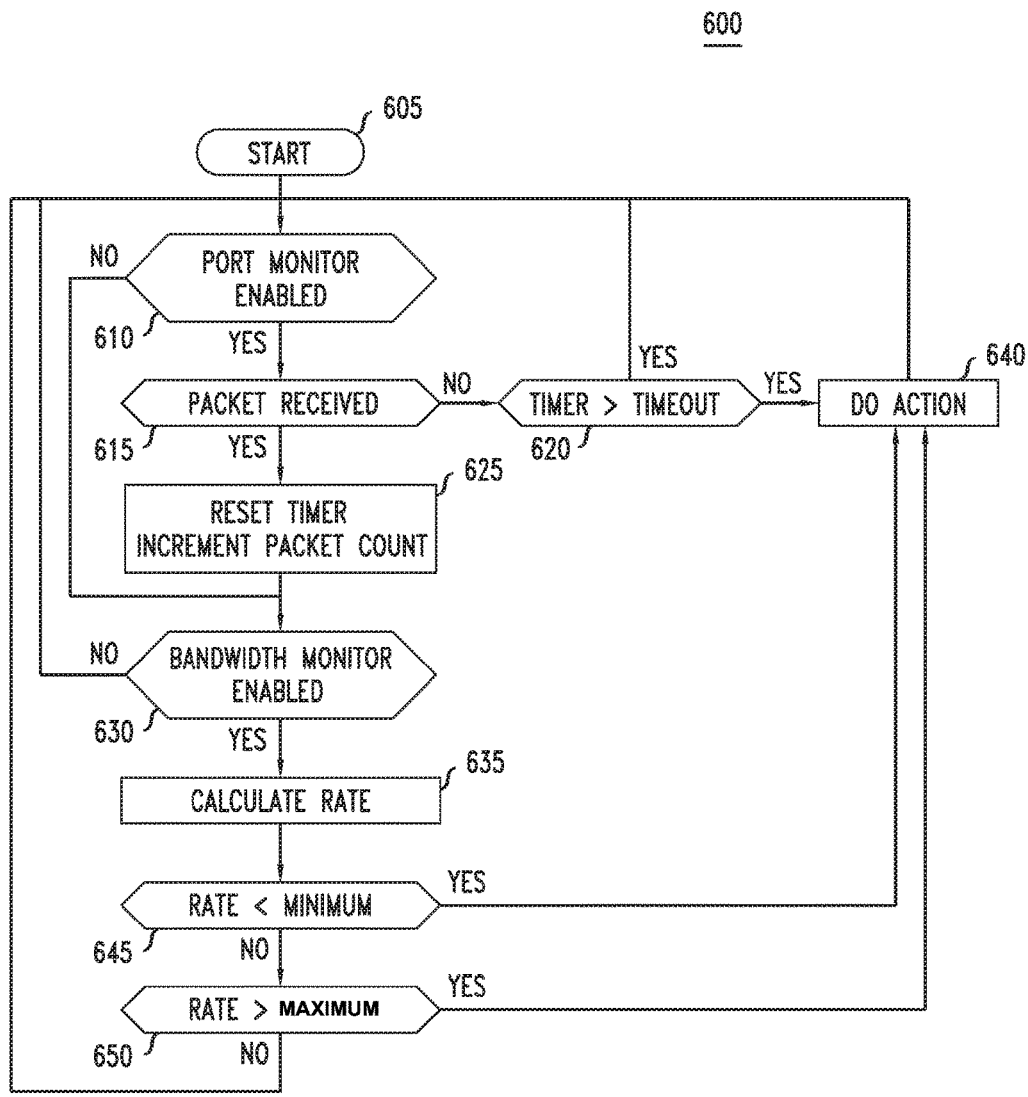
FIG. 8 is a flowchart illustrating a traffic monitoring process.

If, however the device determines there is a multi-ended device coupled thereto, the process proceeds to step 225 where the traffic monitor is enabled (see FIG. 8). The process ends at step 210.

Figure 5:
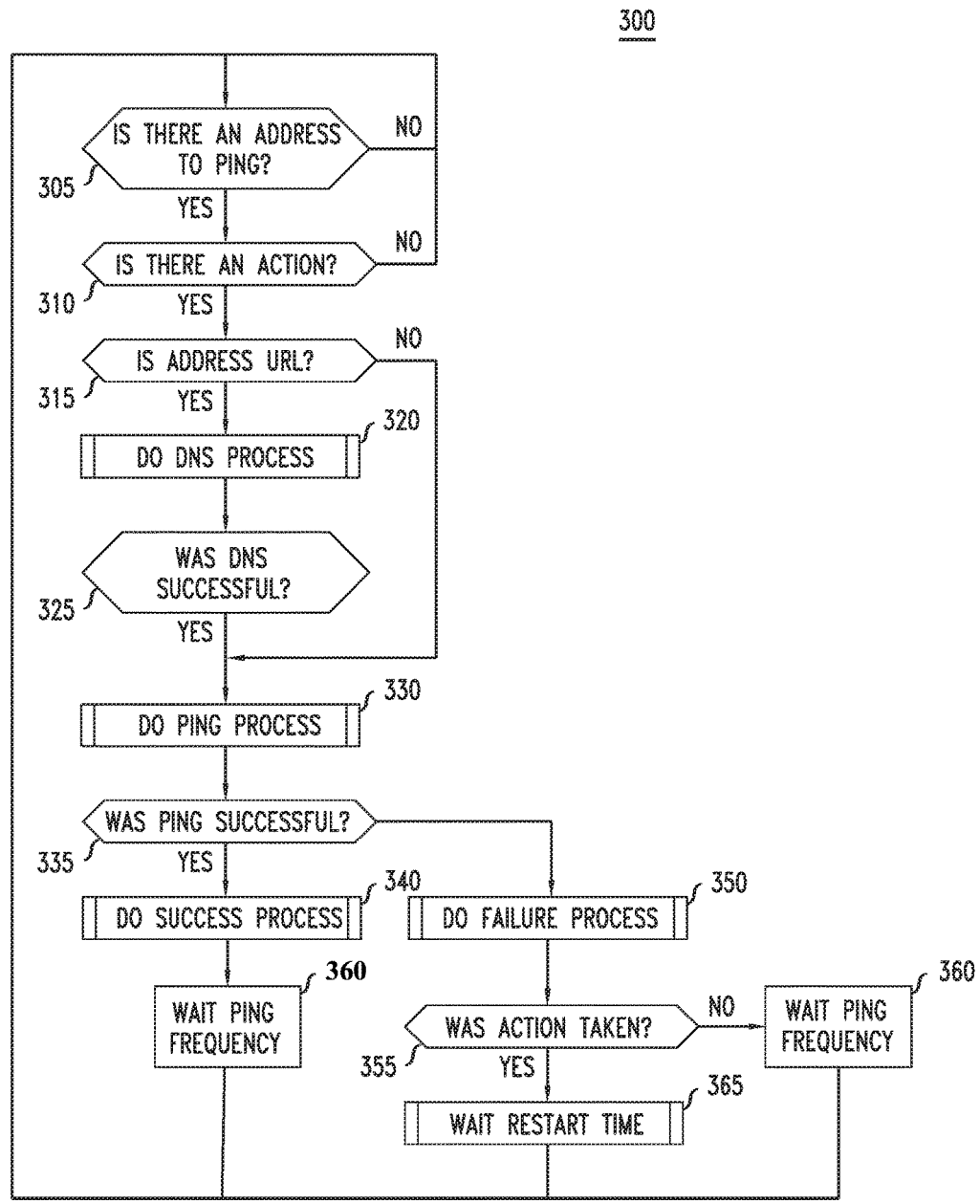
FIG. 5 is a flowchart illustrating a methodology used to auto-ping a powered device.

FIG. 5 illustrates a methodology in accordance with the auto-ping configuration of the device. The auto-ping methodology 300 enables the monitoring device or device to auto-ping the PD. In steps 305 and 310, the monitoring device performs a test to determine if the auto-ping if configured and configured correctly.

In step 315, it is determined whether the pingable address is a URL. If the pingable address is a URL, then in step 320, a DNS process is followed, and a check is followed in step 325 to ascertain whether the DNS process was successful under this DNS protocol.

The DNS process is generally used to resolve the UR to an IP address. The address resolution protocol (ARP) is then sent to either a DNS server or alternatively a router if not DNS server is present. A check will determine whether the ARP response has been received. If no response is received after a predetermined wait time, the process is deemed a failure and terminated. Alternatively, when a response is received a DNS query is sent. A similar wait process then occurs to determine if a DNS response has been received. Upon receiving a DNS response, the ping address is set and the methodology continues to the ping process in step 330.

Here, the ARP is sent to the ping address with a similar wait/failure process being implemented. As with the DNS, if the address to be pinged is local, the ARP goes to the IP address to be pinged, otherwise it goes to the router. Upon a successful response being received, an internet control message protocol (ICMP) Echo is sent to ping the address. After yet another wait/failure process and the latency between the sent and received message is calculated. If the latency period is too long then the process will fail. Upon a calculation of a proper latency period, the ping sub process has been completed. Depending on if the process was successful or a failure, a success sub-process or a failure sub process will be executed as shown in steps 340 and 350 respectively.

Figure 6:
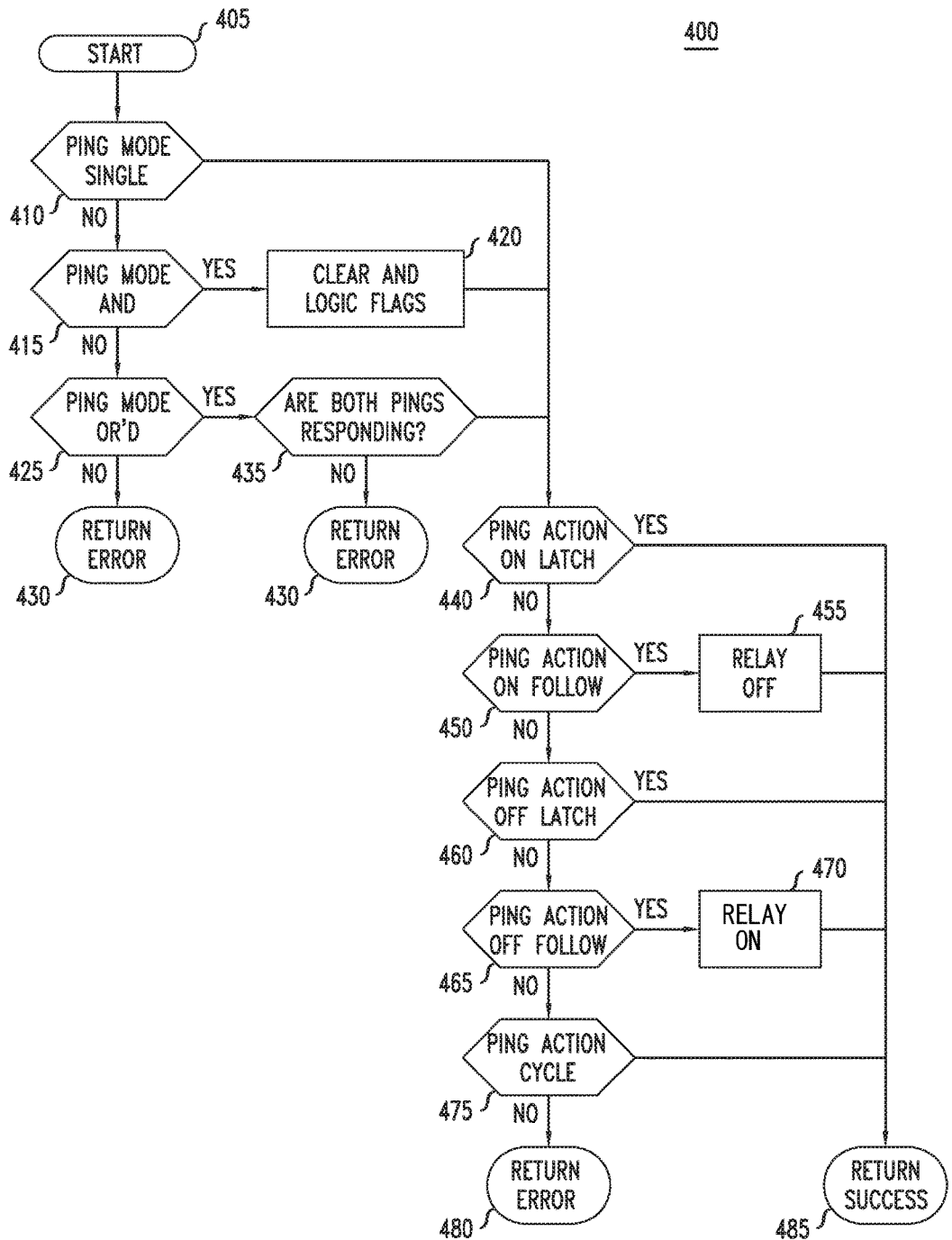
FIG. 6 is a flowchart illustrating a successful auto-ping to a powered device.

After a successful success process (see FIG. 6), the ping frequency is measured in step 360. After any failure process (see FIG. 7), it is determined, in step 355, if an action was taken. If yes, then the process implements a restart time delay in step 365, whereas if no action was taken there is a wait period for the ping frequency in step 360.

The auto ping can operate in three distinct modes: "single" (ping one IP address), "and" (ping two IP addresses where both must fail for monitoring device to take action), and "or'd" (ping two IP address where either failing causes monitoring device to take action).

In step 410, the device tests the "single" ping mode, and if ascertained that the device is in this mode, the process to step 440.

Alternatively, the "and" ping mode is tested if the "single" ping mode is not enabled. A success or ascertaining that the monitoring device is operating in this ping mode moves the process to a step 420 where logic flags are cleared and then the process moves to a step 440.

Alternatively, the "or'd" ping mode is tested, in step 425, if the "and" mode is not enabled. A failure here results in an error to be retuned in step 430 as the device is purportedly not operating in any ping mode. A designation of the monitoring apparatus operating in the "or'd" ping mode causes the device to test, in a step 435, if both pings are responding. If one or more pings are not responding an error is returned in step 430. Assuming both pings respond, the process moves to step 440.

In step 440, the system checks or tests for a ping action on latch. A successful check results in the system to return a set up success in step 485. If the action is not "on latch," the process moves to step 450.

In step 450, the system checks or tests for a ping action on follow. A successful check at this point results in at least one relay switch being turned off in step 455. The system then sends a success message in step 485. If the action is not "on follow," the process moves to step 460.

In step 460, the system checks or tests for a ping action off latch. A successful check results in a returned success in step 485. A failure results in the process moving to step 465.

In step 465, the system checks or tests for a ping action off follow. A successfully check results in at least one relay switch being turned off in step 470 and causes the system to return a success in step 485. If the ping action is not "off latch," the process moves to step 475.

In step 475, the system checks or tests for a ping action cycle. A successful check results in a success message in step 485, whereas a failure at this point results in an error being returned to the system in step 480.

Figure 7:
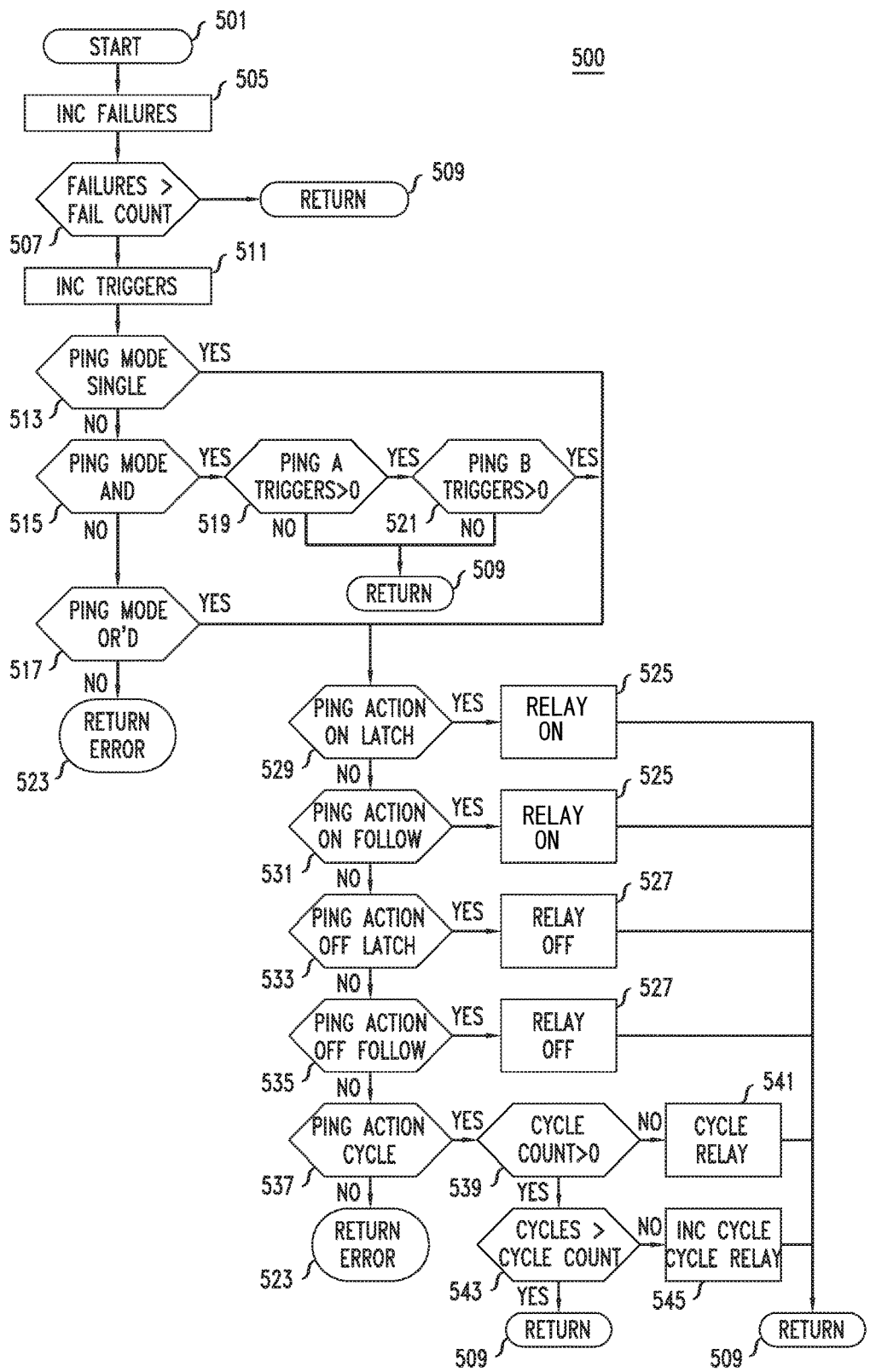
FIG. 7 is a flowchart illustrating an unsuccessful auto-ping to a powered device.

In FIG. 7, there is a flowchart that describes the failure process as shown in step 350 of FIG. 5. The method 500 beings in step 501. In step 505, any failures are accounted for and in step 507 it is determined whether the amount of failures are larger than the prescribed failure count. If the failures are less than the fail count, then the process returns to that of FIG. 5 as shown instep 509. If the failures are greater, then in step 511, the triggers are incremented in.

To attempt to ascertain the point of failure, the "single" ping mode is tested by the device. If positive, the process moves to step 529 and if negative the process moves to step 515.

In step 515, the "and" test is performed to determine if the auto-ping is operating in the "and" mode. A positive response here leads to a comparison between the ping A and ping B triggers. If the triggers are equal to zero then the process returns to that of FIG. 5 as shown instep 509. Otherwise, the process moves to step 529.

In step 517, the "or'd" test is performed to determine if the auto-ping is operating in the "or'd" mode. If a positive result is not achieved, then an error is retuned as shown in step 523.

The ping action on latch, in step 529, is tested with a positive response resulting in at least one relay being turned on in step 525 and the process being retuned in step 509. Otherwise, the process moves to step 531.

The ping action on follow, in step 531, is checked or tested with a positive response resulting in at least one relay being turned on in step 525 and the process being retuned in step 509. Otherwise, the process moves to step 533.

The ping action off latch, in step 533, is checked or tested with a positive response resulting in at least one relay being turned off in step 527 and the process being retuned in step 509. Otherwise, the process moves to step 535.

The ping action off follow, in step 535, is checked or tested with a positive response resulting in at least one relay being turned off in step 527 and the process being retuned in step 509. Otherwise, the process moves to step 537.

Here, in step 537, the ping action is checked or tested to see if the action is cycle. If the ping action is not cycle, then an error is returned in step 523. In step 539, if the cycle count is not greater than zero, a cycle relay occurs in step 541 and the process returns in step 509. If in step 539, the cycle count is greater than zero, it is determined in step 543 if the cycles calculated is greater than the cycle count set for the device. If the amount of cycles is greater, then the process is returned in step 509. Otherwise, the relay is cycled and the cycle count is increased in step 545 and the process is subsequently retuned in step 509 upon completion.

Referring now to FIG. 8, once the auto-configuration process described herein has determined that the device attached to the PSE port is a multi-ended device, the traffic monitoring will start monitoring the data transmitted by the attached device. The default settings for the traffic monitor are: PSE port monitoring enabled, fail time 10 seconds, action cycle once, restart time 30 seconds, bandwidth monitor disabled, min. traffic 1 packet/s, max. traffic 50,000 packets/s, action off, and restart time manual.

The traffic monitoring method 600 begins in step 605. In step 610, the system checks to ensure that the port monitor is enabled. If the port monitor is enabled, the process goes to step 615. Otherwise, the system checks if the bandwidth monitor is enabled in step 630. If the bandwidth monitor is enabled, then a rate is calculated in step 635. Otherwise, the process moves to step 610. This ensures that either the port monitoring or bandwidth monitoring is enabled. If neither is functioning, then the process will not execute.

In step 615, the system checks to ensure the packet was received. If it was not received then the process goes to step 620 where a timing process occurs. If the timer calculates a longer wait time than for what the timeout threshold allows then the process goes to step 640. If the packet was received in step 615, the process moves to step 625 where a reset of the timer, used in step 620, occurs. Further, the packet count is increased or incremented thereby allowing the rate calculation in step 635 to be achieved. The bandwidth monitor may then be examined for its operational status or this may be bypassed depending on the system configuration. The rate is calculated in step 635. If the minimum packet transfer is less than the calculated rate then the process moves to step 640. Otherwise the rate is checked to see if it is greater than the maximum and in either case, the appropriate action is applied in step 640.

Figure 9:
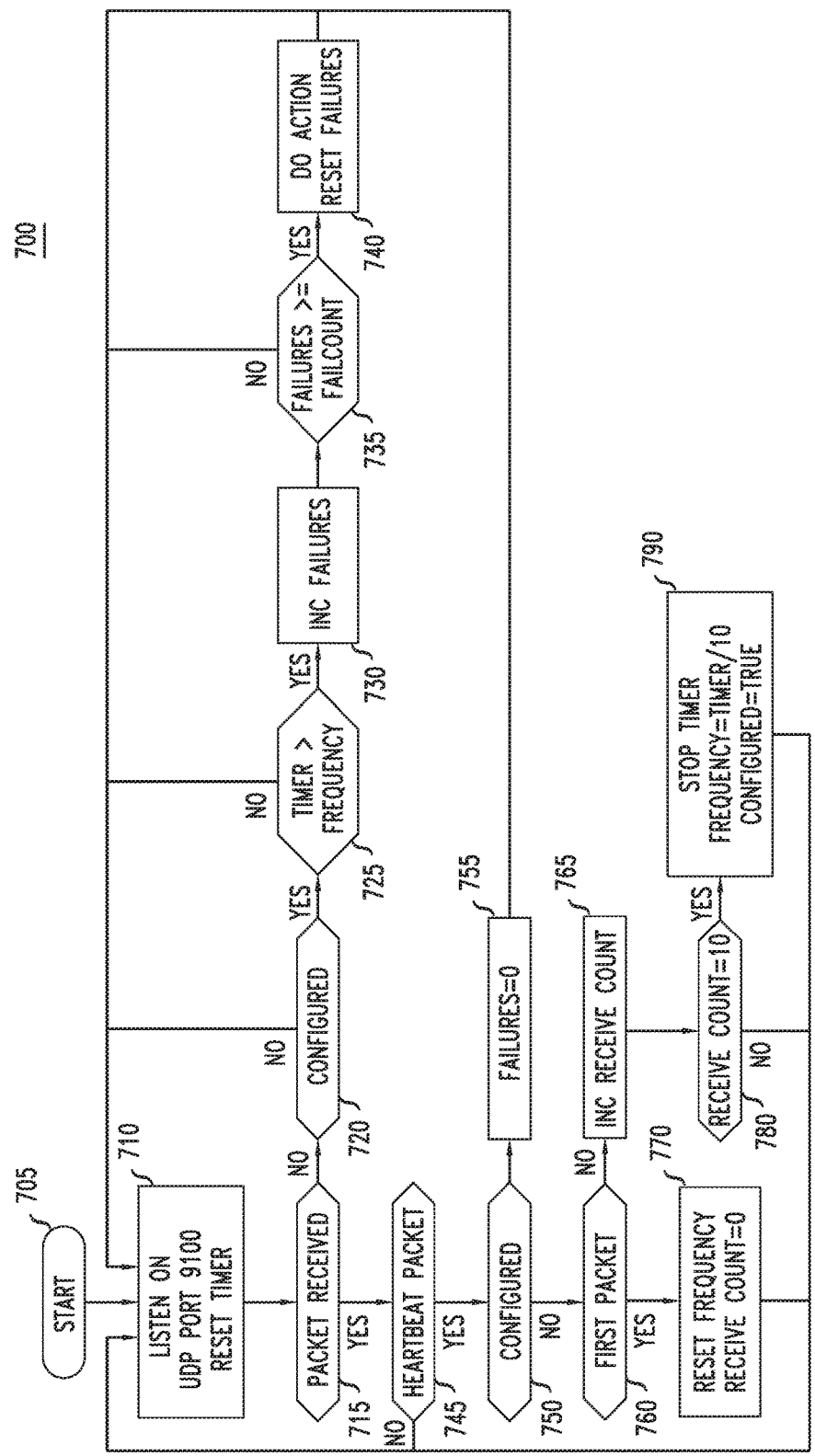
FIG. 9 is a flowchart describing a heartbeat monitoring process.

FIG. 9 describes the "heartbeat" methodology of the present invention. The heartbeat is self-configuring, however, it is not configured as part of the auto-configuration process described herein. On the startup of the heartbeat protocol, it will begin to listen for the message on UDP port 9100 or another comparable port. After the first heartbeat, the time between the next nine (9) will be measured. The average time between each heartbeat serves as the frequency. The device will cycle the power of the device attached to the PSE port (second port) after three consecutive heartbeats are missed. Afterwards the heartbeat will reconfigure and start the process over.

The methodology 700 begins in step 705. In step 710, the heartbeat begins listening on UDP port 9100 or other previously programmed port. In step 715, the system checks to see if a packet has been received by the device. If a packet has been received, then, in step 745, there is a test to see if the received packet is a heartbeat packet. If it is not a heartbeat packet, the monitoring device continues to listen on, for example, UDP port 9100 or said other port. If it is a heartbeat packet, then the monitoring device checks to see if the heartbeat is configured in step 750. If the heartbeat is configured the failures are cleared in step 755 and thereby continues to listen on the programmed port.

If this is the first heartbeat packet, as shown in step 760, then the frequency and receive count is reset to zero (0) in step 770, with the frequency being the expected time between heartbeats. If this is not the first heartbeat packet, then the received packet count is increased or incremented in step 765. If the received count is equal to ten (10), as shown in step 780, then the configuration timer is stopped, a new frequency is calculated, and the configured flag is set by the system in step 790. Otherwise, the device continues to listen on the programmed port.

If no packet was initially received, then the device checks to see if the heartbeat is configured in step 720. If it is not, then the device continues to listen for a packet on UDP port 9100 or said other port. If it is configured a check or test is done to see if the timer setting is greater than the frequency in step 725. If the amount of calculated time since the last packet was received is greater than the frequency, then a system failure has been detected. If this is the case, failures are increased or incremented in step 730. If the failures are greater than or equal to the failure count, as shown in step 735, then the programmed action occurs in step 740 and the fail counter is reset to zero (0). Otherwise the device continues to listen for packets on the programmed port.

In practice, the POE monitoring device as described above is preferably coupled to a PSE, such as a switch, which enables both local and remote monitoring of the PD. A communications line having POE capabilities is connected to the PSE as well as the POE device as described in FIGS. 1-3. A second communications line, having POE capabilities, is coupled to the POE device which is also coupled to the PD. Multiple POE devices (monitoring devices) can be coupled to the PSE and multiple PDs thereby enabling simultaneous remote and/or local monitoring of the PD.

The power in from the POE switch (PSE) will preferably be the same as delivered to the PD. Once coupled, the auto-configuration process described in FIG. 4 above is executed. During which, the auto-ping or traffic monitor will be configured. The auto-ping, traffic monitor, and heartbeat are each used to singularly or in conjunction monitor the PD for activity and when a lapse in activity is detected to enable automatic power control of the PD.

The auto-ping is used to ping a single ended device attached to the PSE port (second port) of the device. Auto-ping sends an ICMP echo as described above and waits for a response. A return time for the response is measured. A running average is the calculated and stored as the overall network latency. Typically, the auto-ping will wait up to two (2) seconds for a response and this wait period may be customizable. Using these metrics, the auto-ping determines whether the PD should be rebooted. In a preferred embodiment, if three (3) consecutive responses have been missed, then the PD is rebooted. In some embodiments, the number of consecutive missed responses is programmable and may be varied as desired. Additionally, if the desired number of consecutive pings fails or network latency becomes greater than the programmable value, or about 2× the initial network latency, then the PD is also power controlled.

The traffic monitor monitors the Ethernet traffic that is transmitted by the device attached or coupled to the PSE port. This enables the traffic monitor to monitor multi end device such as a wireless hotspot. By monitoring the traffic as it flows through the device, the device can determined when the traffic has stopped flowing. When the traffic has stopped flowing, for at least ten (10) seconds or other set time frame, the attached device (PD) will be power controlled by the device.

Further, the traffic monitor can measure and monitor the bandwidth sent through the device. Such a bandwidth measurement may occur in bytes/second, however, the device can only measure in packets/second. When the number of packets/second increase above a set point or below a set point the PD can be power controlled.

The heartbeat listens for a message to be sent to the device. The heartbeat can be received on either the first or second port (PSE or PD port respectively). Once configured, the heartbeat will control the power of the PD, such as with the auto-ping and traffic monitoring feature, upon proper system determination.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An apparatus for remotely rebooting at least one electronic device, the apparatus comprising:
   a first port adapted to interface with a first communications line, the first communications line being capable of transmitting and receiving both data and power,
      wherein the first port is configured to receive a series of signals,
         wherein an average timeframe between two sequential signals in the series of signals is classified as a frequency of the series of signals,
         wherein, if a predetermined number of sequential signals in the series of signals is not received over a period of time equal to the frequency multiplied by the predetermined number of sequential signals, a rebooting signal is received by the first port, wherein the rebooting signal causes a change in an operative state of the at least one electronic device, and
         wherein one or more of the at least one electronic device is a power over Ethernet enabled electronic device;
   a second port adapted to interface with a second communications line, the second communications line being capable of transmitting and receiving both data and power,
      wherein a power over Ethernet switch is coupled to the apparatus via the second port, and
      wherein the first communications line is coupled to the at least one electronic device and the power over Ethernet switch, enabling one or more signals to be exchanged between the at least one electronic device and the power over Ethernet switch; and
   at least two status light emitting diodes,
      wherein at least one status light emitting diode corresponds to an operative state of the first port and at least one status light emitting diode corresponds to an operative state of the second port.

2. The apparatus of claim 1 further comprising at least one power port capable of receiving power from an external power supply module.

3. The apparatus of claim 1 further comprising at least one securement mechanism that secures a position of the apparatus.

4. The apparatus of claim 1 wherein the first and the second communications line is a Cat 5, 5E, or 6 Ethernet cable, or a combination thereof.

5. The apparatus of claim 1 further comprising a processor and a memory, the processor being operably coupled to the memory,
   wherein the processor has machine readable instructions capable of executing a program that controls the operative state of at least one electronic device.

6. A system for monitoring and remotely rebooting at least one electronic device, the system comprising:
   at least one monitoring apparatus, the at least one monitoring apparatus having a first port and a second port,
      wherein each of the first port and the second port are adapted to interface with a first and a second communications line respectively, the first and the second communications line being capable of transmitting and receiving both data and power;
   a first electronic device communicatively coupled to the at least one apparatus via the first port,
      wherein the first electronic device is configured to receive a series of signals,
      wherein the first electronic device is automatically rebooted via the at least one apparatus, and
      wherein the first electronic device is a power over Ethernet enabled electronic device,
         wherein an average timeframe between two sequential signals in the series of signals is classified as a frequency of the series of signals,
         wherein, if a predetermined number of sequential signals in the series of signals is not received over a period of time equal to the frequency multiplied by the predetermined number of sequential signals, then a rebooting signal is sent by the at least one monitoring apparatus, wherein the rebooting signal causes a change in an operative state of the at least one electronic device;
   a second electronic device communicatively coupled to the at least one apparatus via the second port,
      wherein the second electronic device is a power over Ethernet switch; and
   a status light emitting diode, wherein the status light emitting diode corresponds to an operative state of the first port or the second port, and
      wherein the first communications line is coupled to the at least one electronic device and the power over Ethernet switch, enabling one or more signals to be exchanged between the at least one electronic device and the power over Ethernet switch.

7. The apparatus of claim 1 wherein the first communications line and the second communications line transmits power and transmits and receives data.

8. The system of claim 6 wherein power flows from the second electronic device to the at least one monitoring apparatus to the first electronic device, and data flows bi-directionally to and from the first electronic device, at least one monitoring apparatus, and the second electronic device.

* * * * *